US007971547B1

(12) United States Patent
Hertel, III et al.

(10) Patent No.: US 7,971,547 B1
(45) Date of Patent: Jul. 5, 2011

(54) UNDERWATER SURFACE CLEANING VEHICLE FOR INTEGRATED CLEANING AND EFFLUENT TREATMENT SYSTEM

(75) Inventors: William Martin Hertel, III, Annapolis, MD (US); Jeffrey Neal Ledda, Prince Frederick, MD (US); Thomas P. McCue, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 745 days.

(21) Appl. No.: 11/998,978

(22) Filed: Nov. 5, 2007

Related U.S. Application Data

(60) Provisional application No. 60/856,472, filed on Nov. 3, 2006, provisional application No. 60/856,473, filed on Nov. 3, 2006.

(51) Int. Cl.
*B63B 59/06* (2006.01)
*B63B 59/08* (2006.01)
*B63B 59/10* (2006.01)
*B60S 3/00* (2006.01)

(52) U.S. Cl. ............................ 114/222; 15/1.7; 15/53.1

(58) Field of Classification Search .................. 114/222; 15/1.7, 53.1–53.3
See application file for complete search history.

(56) References Cited

U.S. PATENT DOCUMENTS

| | | | | | |
|---|---|---|---|---|---|
| 4,095,378 | A | * | 6/1978 | Urakami | 451/88 |
| 4,153,558 | A | | 5/1979 | Frykhult | |
| 4,401,048 | A | | 8/1983 | Rogers | |
| 4,574,722 | A | * | 3/1986 | Orita et al. | 114/222 |
| 4,838,193 | A | * | 6/1989 | van der Tak | 114/222 |
| 4,860,400 | A | * | 8/1989 | Urakami | 15/98 |
| 5,398,632 | A | * | 3/1995 | Goldbach et al. | 114/222 |
| 5,437,794 | A | | 8/1995 | Andersson | |
| 5,628,271 | A | | 5/1997 | McGuire | |
| 5,852,984 | A | * | 12/1998 | Matsuyama et al. | 114/222 |
| 5,947,051 | A | | 9/1999 | Geiger | |
| 6,595,152 | B2 | | 7/2003 | McGuire | |

FOREIGN PATENT DOCUMENTS

DE 3229720 A1 * 2/1984

* cited by examiner

*Primary Examiner* — Ajay Vasudeva
(74) *Attorney, Agent, or Firm* — Dave A. Ghatt

(57) ABSTRACT

A method and apparatus for the cleaning of an underwater surface, such as a hull. The method and apparatus enables cleaning to be conducted while mitigating the release of removed material into surrounding waters. The integrated apparatus includes a cleaning deck for removing fouling from the underwater hull surface, and a pre-processing deck with integrated components for the processing of cleaning effluents. According to the method and apparatus, materials removed by the shroud are sucked into the pre-processing deck, crushed, and separated into a separator effluent that may be recycled to the shroud, and a concentrate, which is discharged to a land treatment unit for further processing.

18 Claims, 6 Drawing Sheets

UNDERWATER SURFACE CLEANING VEHICLE FOR INTEGRATED CLEANING AND EFFLUENT TREATMENT SYSTEM

CROSS-REFERENCE TO RELATED APPLICATIONS

This application claims the benefit of U.S. Provisional Application No. 60/856,472 filed Nov. 3, 2006, which is incorporated herein by reference.

This application is related to U.S. Non-Provisional patent application Ser. No. 11/998,989, filed Nov. 5, 2007, entitled "Integrated Underwater Surface Cleaning and Effluent Treatment System", which is based on U.S. Provisional Application No. 60/856,473, filing date Nov. 3, 2006, hereby incorporated herein by reference.

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to an underwater surface cleaning vehicle, and in particular to an integrated underwater surface cleaning vehicle having a pre-processing unit for the initial processing of cleaning effluents.

BACKGROUND

Navy ships are periodically cleaned using open cycle cleaning devices such as, for example, submerged cleaning and maintenance platform (SCAMP) technology that utilizes integrated impeller and cleaning brush technology and results in the direct discharge of removed constituents such as, for example, biological fouling, hull coatings, and corrosion byproducts into surrounding water. Most antifouling coatings utilize heavy metals such as Cu and Zn as biocides that are released during cleaning operations at levels that can exceed water quality criteria. This has prompted governments to develop standards to manage this discharge or, in some cases, to prohibit open water cleaning of hulls with coatings that have antifoulants in them without special permission.

Waterborne underwater hull cleaning is critical to the worldwide operation and maintenance of Navy ships and impacts operating capability (e.g., speed and maneuverability), acoustic signature, fuel efficiency and the maintainability and lifecycle of critical systems including underwater hull coatings, impress current cathodic protection systems, and propulsion systems.

SUMMARY

Disclosed are systems and techniques for conducting advanced waterborne underwater ship hull and other submerged or partially submerged surface cleaning using integrated surface contaminant removal, capture, containment, collection, comminution, concentration, separation, reuse and transport technology. The concentrate stream generated is transported for subsequent processing for recycle or disposal at a substantially reduced volume. This invention mitigates the release of toxicants and other material during the waterborne hull cleaning operations.

In one aspect, the invention is a cleaning vehicle for cleaning an underwater surface. In this aspect, the cleaning vehicle has a pre-processing deck and a cleaning deck or shroud pivotally connected to the processing deck. The pre-processing deck includes one or more circulation pumps downstream of the cleaning deck for initiating the suctioning of the cleaning deck onto the underwater surface and for initiating a particulate flow of water entrained material removed by the cleaning deck. The invention further includes a solids-processing unit downstream of the cleaning deck for crushing and fracturing solids in the particulate flow. Additionally, the apparatus includes a separator unit downstream of the solids-processing unit for partitioning the particulate flow into a separator effluent and a concentrate of crushed material. According to the invention, the cleaning deck has one or more abrasion devices for removing fouling from the underwater surface, and a deck mouth for the intake of the particulate flow of water entrained material.

In another aspect, the invention is a method of cleaning an underwater hull surface using a cleaning vehicle having a pre-processing deck and a cleaning deck pivotally connected to the processing deck. The pre-processing deck has one or more circulation pumps, a solids-processing unit, and a separator unit. The cleaning deck comprises one or more abrasion devices and a cleaning deck mouth. In this aspect, the method includes the drawing of the cleaning deck into contact with the underwater surface by using the one or more pumps to generate a reduced pressure between the cleaning deck and the underwater hull surface. The method also includes the removing of fouling from the underwater hull surface by applying the one or more abrasion devices to the underwater hull surface. The method further includes the generating of a particulate flow of water entrained material removed by the one or more abrasion devices, by using the one or more pumps to draw the removed material and surrounding water, and the crushing and fracturing in the solids-processing unit, solid material in the particulate flow. The method further includes the partitioning in the separator unit the particulate flow into a separator effluent and a concentrate of crushed fouling material.

Other objects, features, and advantages will be apparent from the description and the drawings.

DETAILED DESCRIPTION

Figure 1:
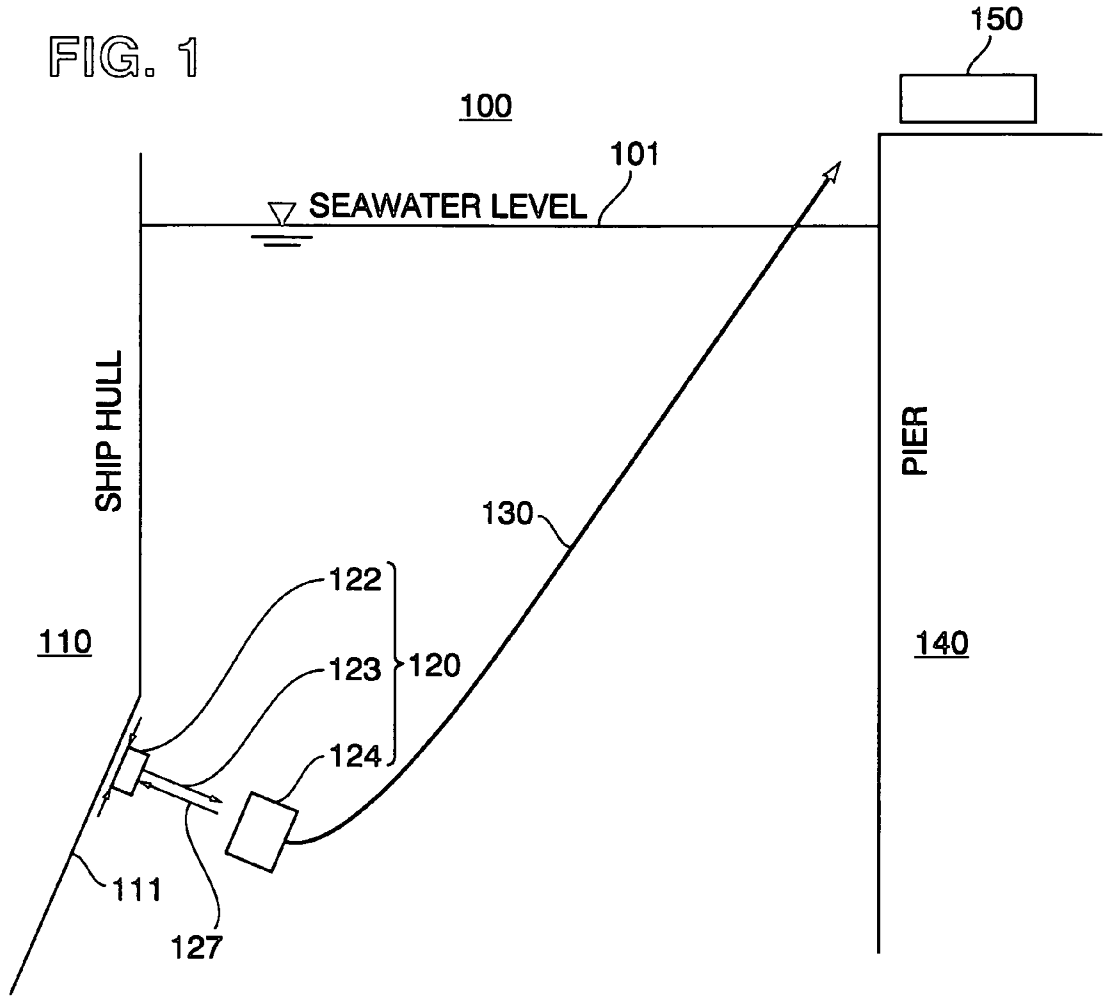
FIG. 1 is an exemplary flow diagram of an integrated hull cleaning and effluent treatment system according to an embodiment of the invention.

The described systems and techniques entail an underwater cleaning and integrated water and solids capturing, containing, comminuting, separating, concentrating, reusing and transferring process for conducting waterborne underwater cleaning. By design, the below-described method and apparatus enables cleaning to be conducted while mitigating the release of removed material into surrounding waters. FIG. 1 is an exemplary flow diagram of an integrated hull cleaning and effluent system 100 for performing the above-recited functions.

As illustrated in FIG. 1, the system 100 includes a ship hull 110 having a hull surface 111, the ship hull docked in relatively close proximity to a pier 140. The system 100 further includes a cleaning vehicle 120 having two parts (decks), a cleaning deck or shroud 122 and a pre-processing deck 124. The cleaning deck 122 moves across the hull surface 111 to physically remove fouling and other undesired buildups from hull surface. The pre-processing deck 124, via a reduced pressure gradient, sucks the particulate flow of removed fouling material and other cleaning material such as antifoulant coatings having heavy metal toxicants, along with surrounding water through the cleaning deck 122 into the pre-processing deck 124. The surrounding water may be seawater, freshwater or another type of water depending on the environment in which the ship is docked. A flexible hose 123 may facilitate the transportation of the water entrained material or slurry from the cleaning deck 122 to the pre-processing deck 124. As will be outlined below, the pre-processing deck 124 treats the water entrained material, separating the particulate flow into a separator effluent and a concentrate of crushed fouling material. The separator effluent is directed back towards the cleaning deck 122 via line 127. Line 127 may comprise a flexible hose having a diameter of about 2 inches to 4 inches. The separator effluent may be reused to supplement further cleaning operations. Alternatively, the separator effluent may be discharged directly into the water. FIG. 1 shows line 130 through which the concentrate of crushed fouling material is transported to a land treatment unit 150, for subsequent processing of the concentrate. The land treatment unit 150 may be located on the pier. Alternatively, the land treatment unit 150 may be located on a ship such as a barge or on another platform. The line 130 may be a flexible hose of sufficient length and diameter, for example the hose may be about 400 feet to about 1000 feet in length, and about 1 inch to about 2 inches in diameter. Although the system 100 shows a ship hull 110, the cleaning vehicle 120 may be used to clean other submerged surfaces.

Figure 2A:
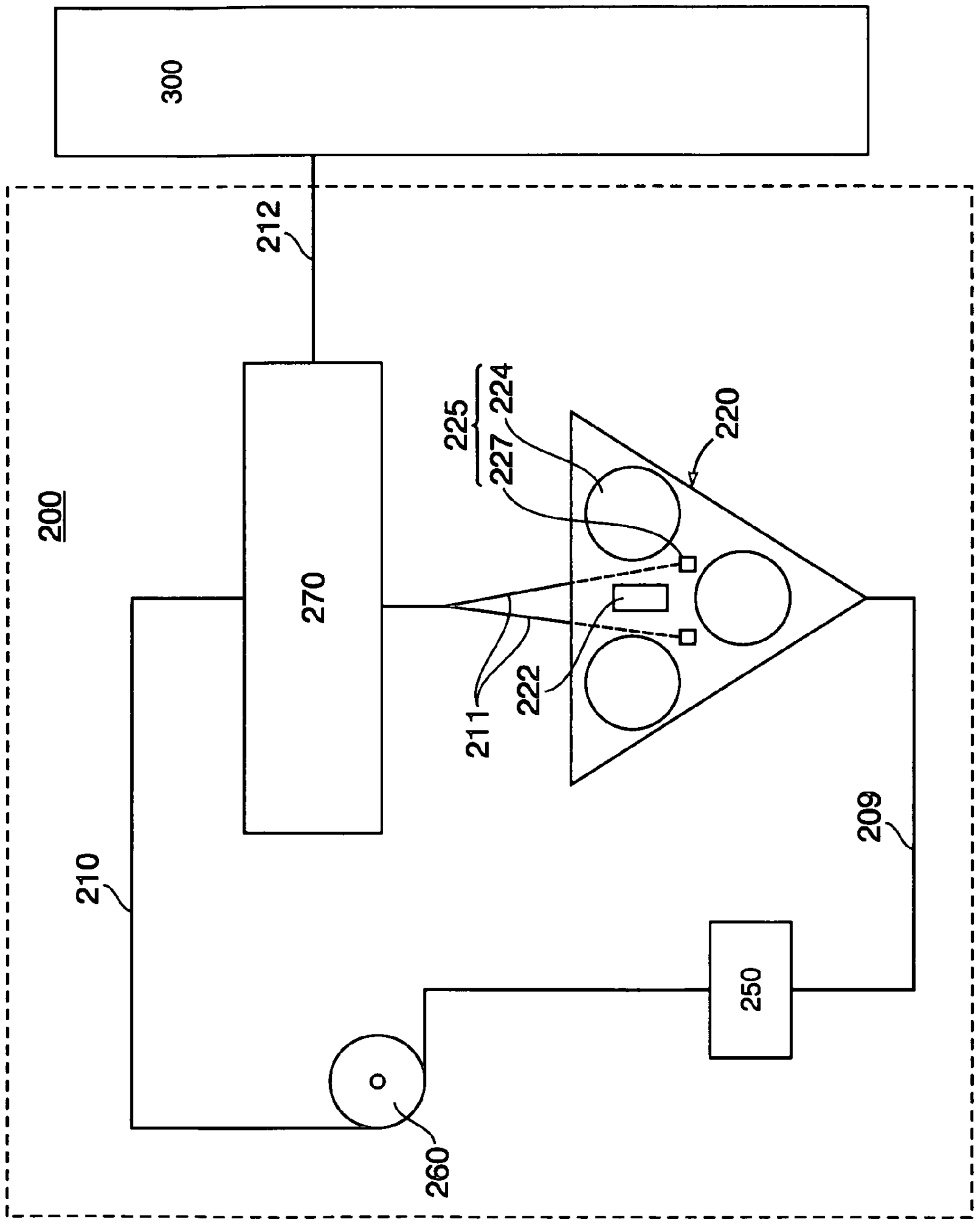
FIG. 2A is a schematic illustration of a cleaning vehicle for cleaning an underwater surface according to an embodiment of the invention.

FIG. 2A illustrates a cleaning vehicle 200 (within the dotted box) including a cleaning deck or shroud 220 as well as effluent treatment devices downstream of the shroud 220, for cleaning an underwater surface, such as a hull surface. FIG. 2A shows a schematic illustration of the elements of the cleaning vehicle 200 according to an embodiment of the invention. FIG. 2A shows the cleaning deck 220 having cleaning units 225, a solids-processing unit 250 downstream of the cleaning deck, a circulation and transfer pump unit 260, also downstream of the cleaning deck, which may be one or more pumps. The pump 260 is directly coupled to the solids-processing unit 250. The cleaning units may include one or more brushing devices and/or one or more nozzles. FIG. 2A also shows a separator unit 270 downstream of the solids-processing unit, which may be a hydrocyclone or similarly robust phase separator device. FIG. 2A also shows conduit lines 209, 210, 211, and 212. The conduit lines may be flexible hoses with line 209 connecting the cleaning deck 220 to the solids-processing unit 250, and line 210 connecting the circulation pump 260 to the separator unit 270. Line 211 also connects the separator unit 270 to the cleaning deck 220. As shown, line 211 is a split line that is connected to the nozzles 227. Line 212 connects the separator to a land treatment unit 300. The land treatment unit 300 may be located on a pier in the vicinity of the docked ship. Alternatively, the land treatment unit 300 may be situated on a ship such as a barge, or on another platform. Lines 209 and 210 convey a particulate flow from the cleaning deck to the separator unit, and line 211 conveys recycled separator effluents to the cleaning deck 220. The diameter of the lines 209, 210, 211, 212 may be adjusted to properly regulate flow-rates and maintain required pressure differences. For example, the diameter of the line 211 may be about 1.5 times the diameter of line 212, with line 211 having for example, a diameter of about 3 inches to about 4 inches and line 212 having a diameter of about 1.5 inch to about 2.5 inches, with line 210 having a diameter of about 3 inches, and line 209 having a diameter of about 4 inches. In one particular embodiment, lines 210 and 211 may have a diameter of about 3 inches and line 212 has a diameter of about 2.0 inches.

Figure 2B:
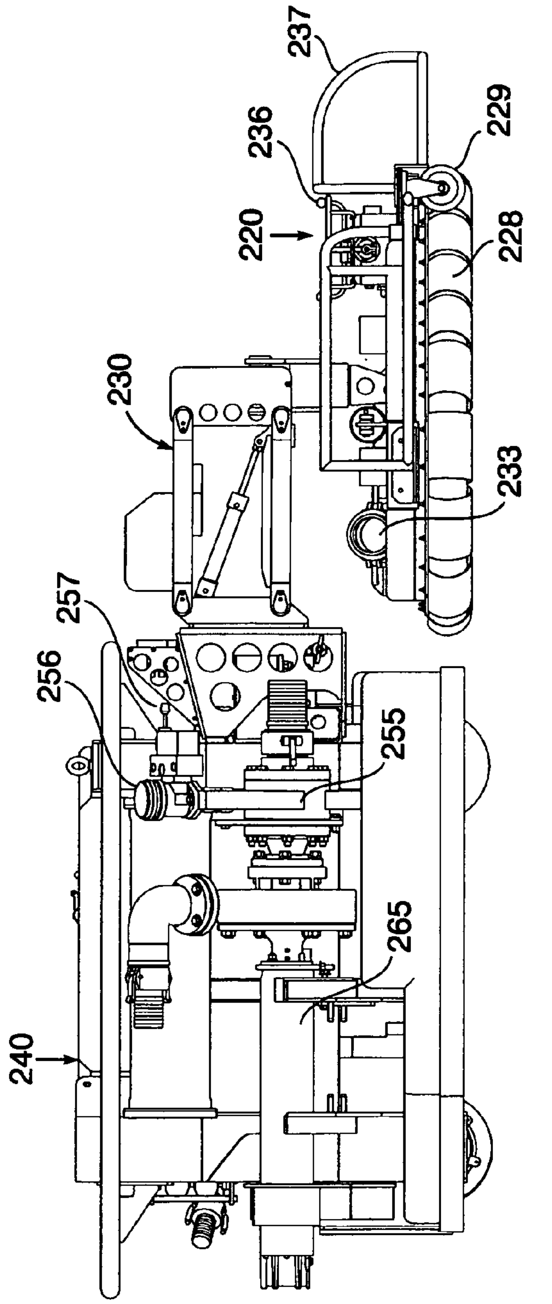
FIG. 2B is an exemplary side view illustration of a cleaning vehicle for cleaning an underwater surface according to an embodiment of the invention.
Figure 2C:
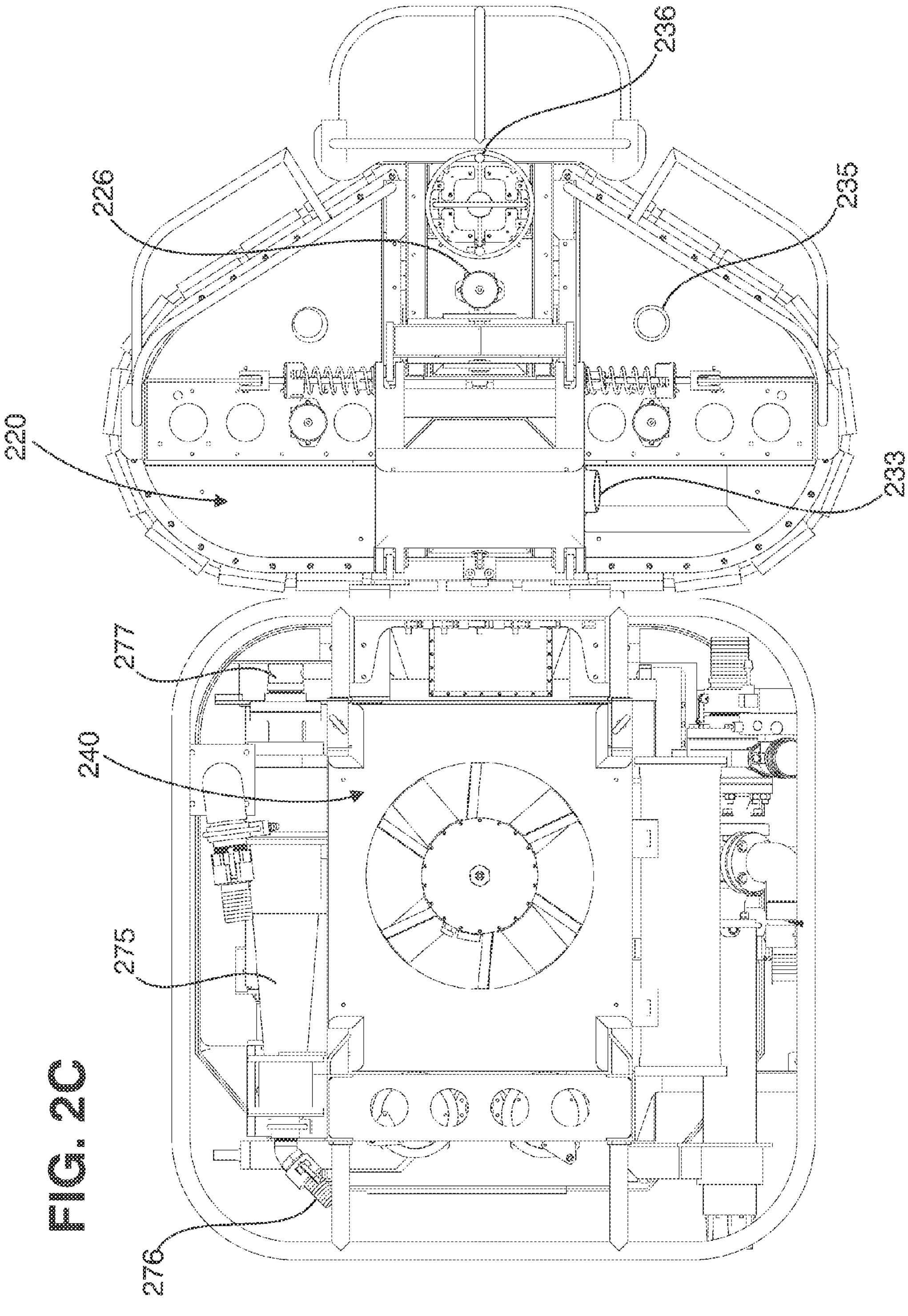
FIG. 2C is an exemplary top view illustration of a cleaning vehicle for cleaning an underwater surface according to an embodiment of the invention.

FIGS. 2B and 2C show side and top views respectively of the cleaning vehicle 200 according to an embodiment of the invention. FIGS. 2B and 2C show the arrangement of the various elements on the cleaning deck or shroud 220 and the pre-processing deck 240, as well as the arrangement of the cleaning deck 220 and the pre-processing deck 240 with respect to each other. FIG. 2B shows the cleaning deck 220 attached to the pre-processing deck 240 via a linkage member 230, which may allow for pivotal movement. The linkage member 230 may include a bar linkage arrangement to control the displacement of the cleaning deck 220 with respect to the pre-processing deck 240. FIGS. 2B and 2C show the cleaning deck having guide wheels 229, a diver control unit 236, and a guard/hand rail 237 to enable an operator to safely and properly control and maneuver the cleaning deck 220. As shown, the cleaning deck 200 also has a deck seal 228 to maintain a reduced-pressure contact with the hull surface. FIGS. 2B and 2C further illustrate a discharge opening or port 233 for discharging the particulate flow, via a conduit such as 210 shown in FIG. 2A, from the cleaning deck 220 to the pre-processing deck 240. The top view of FIG. 2C shows recycling ports 235 for receiving recycled separator of via a conduit such as 211 shown in FIG. 2A, from the pre-processing deck 240.

Figure 2D:
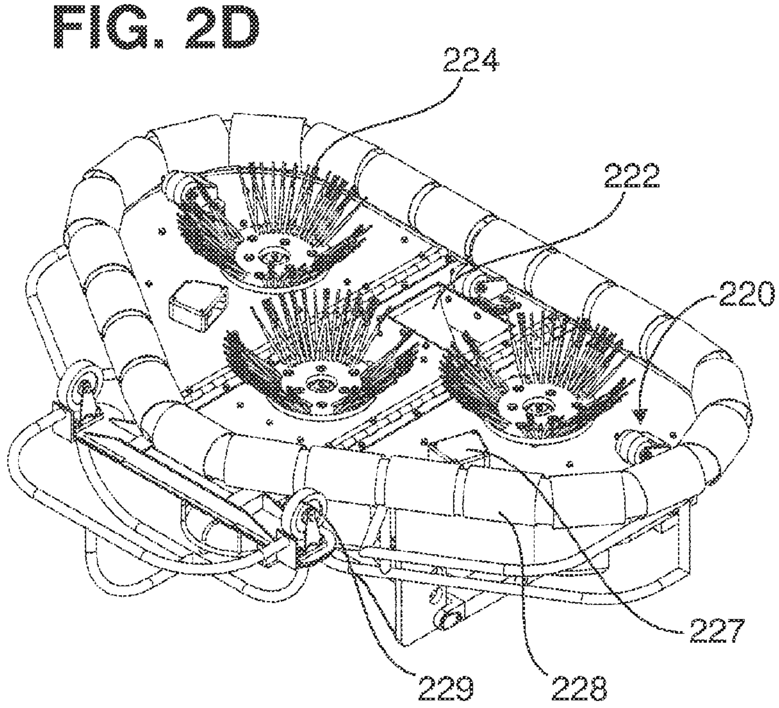
FIG. 2D is an exemplary illustration of a cleaning deck according to an embodiment of the invention.

FIG. 2D also shows the arrangement of the various elements on the cleaning deck 220 according to an embodiment of the invention. FIG. 2D shows a deck suction mouth 222 for the intake of the particulate flow of water entrained fouling and other cleaning material. Also illustrated are reciprocating or rotating brushes 224. The brushes 224 may be arranged in a circular manner and may comprise of steel, polypropylene, combinations thereof, or any other material used for bristles in brushes. The brushes are powered by one or more brush motors 226, as shown in FIG. 2C. The FIG. 2D also shows discharge nozzles 227 for directing and discharging recycled separator effluent. The nozzles 227 are configured and positioned to direct the discharge so that the discharge flow flushes material and other material from the brushes 224. Additionally, the discharge flow from the nozzles 227 creates a water-current which directs into the deck mouth 222, material cleaned from the hull surface 111. Alternatively, the nozzles 227 may be directed to discharge the fluid directly onto the hull surface 111 to assist in the direct removal of fouling deposits. Although FIG. 2D shows three brushes 224, the cleaning deck 220 may contain as many brushes as desired, including less than three brushes or more than three brushes. Similarly, regarding the nozzles 227, the cleaning deck 220 may include as many nozzles as desired.

As stated above, the different elements of the pre-processing deck 240 are also shown in FIGS. 2B and 2C. FIG. 2B shows the deck 240 having a solids-processing unit, which is a crusher 255. FIG. 2B also shows the crusher motor 256 and crusher control lever 257 for operating the crusher 255. The crusher 255 crushes and fractures solids removed during cleaning to for example, about ⅜-in or smaller, while having minimal impact on flow. Incoming solids to be processed can be significant in size, for example as large as 4 inches. FIG. 2B also shows a circulation pump 265, which may have a drive of about 30 HP. The pump 265 initiates the flow needed to generate shroud suction, the particulate flow of water entrained material, and subsequent downstream pressures for solids separation, separator fluid discharge or reuse, and concentrate transport.

FIG. 2C shows the pre-processing deck 240 having a separator unit, a hydrocyclone 275. The hydrocyclone 275 separates, concentrates and partitions the water entrained material into a separator effluent or overflow and concentrate or underflow streams. FIG. 2C also shows the deck 240 having an underflow discharge port 276 that discharges the concentrate towards the land treatment unit 300, and overflow discharge port 277 that discharges/recycles the separator effluent to the shroud 220.

The above outlined apparatus for the cleaning vehicle 200 enables the cleaning operation in the shroud 220, which involves simultaneous brushing, overflow injection, slurry evacuation while maneuvering across the surface to be cleaned. In operation, the cleaning vehicle 200 incorporates the simultaneous application of mechanical and hydrodynamic energy to remove fouling, and uses a differential pressure to induce fluid flow for evacuating removed material. The cleaning vehicle 200 further utilizes the direct injection and diffusion of processed working fluid to increase efficiency and enhance the transport of removed material from the working surface to the shroud 220 through the mouth 222. A method of cleaning an underwater hull surface that incorporates the above-described cleaning vehicle 200 is outlined below.

Figure 3:
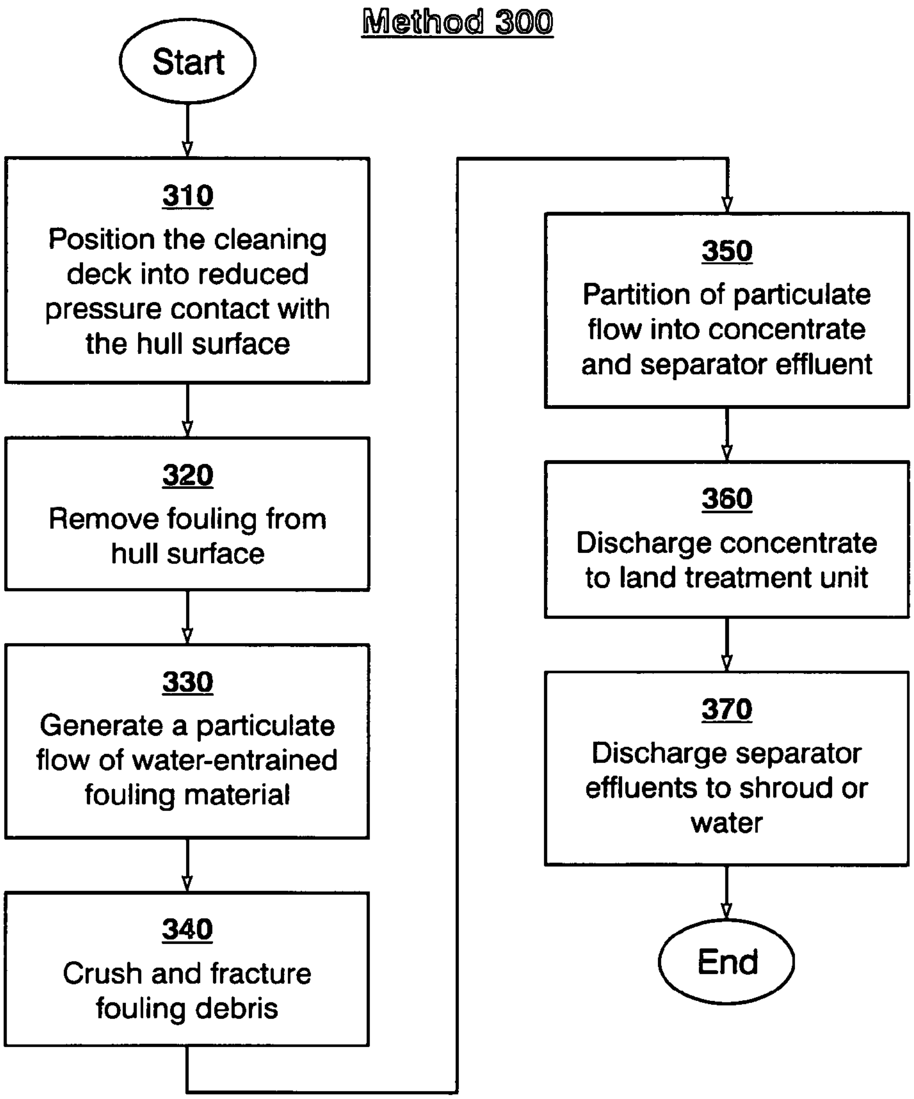
FIG. 3 is a flowchart of a method of cleaning an underwater hull surface according to an embodiment of the invention.

FIG. 3 is a flowchart of a method 300 of cleaning an underwater surface, such as a hull, according to an embodiment of the invention. The method 300 of cleaning involves the use of the cleaning vehicle 200 as outlined above, i.e., a cleaning vehicle having a pre-processing deck 240 and a cleaning deck 220 connected to the processing deck. The pre-processing deck 240 has one or more circulation pumps (260, 265), a solids-processing unit (250, 255), and a separator unit (270, 275). The cleaning deck 220 comprises one or more cleaning devices 225, and a cleaning deck mouth 222.

As shown in FIG. 3, step 310 is the positioning of the cleaning deck/shroud 220 into a reduced pressure contact with the hull surface 111. A diver performs this function, after submerging the cleaning vehicle in the water by known means, such as a crane for example. As outlined with respect to the embodiments of FIGS. 1, 2A, 2B, and 2C, the pre-processing deck 240 includes one or more circulation pumps (260, 265) that create a suctioning force through the mouth 222 of the cleaning deck. Consequently, when a diver brings the cleaning deck 220 into contact with a hull surface 111, a suction-like working contact is created between the hull and the deck because of the reduced pressure created by the one or more pumps (260, 265).

Step 320 is the removing of fouling from the hull surface 111. As shown in the embodiments of FIGS. 2A-2D, the shroud includes cleaning units 225 that comprise motorized circularly arranged brushes 224 that are mounted for rotational or reciprocating movement. The scrubbing or sweeping action of the brushes removes the fouling from the hull surface 111. Step 330 is the generating of a particulate flow of water entrained fouling material. The pressure created by the one or more pumps (260, 265) draws fouling and other cleaning material such as antifoulants removed by the brushes, into the mouth 222 of the cleaning deck 220, with the material entrained in a stream of surrounding water, which includes water peripheral to the cleaning deck and separator effluent injected into the deck. The particulate flow is sucked through the cleaning deck 220 towards the solids-processing unit (250, 255) located on the pre-processing deck 240. The particulate flow is sucked through the cleaning deck 220 at an appropriate rate, for example, at a rate of about 150 gallons per minute to about 170 gallons per minute. At step 340, the solid material in the particulate flow is crushed and fractured in the solids-processing unit in a manner that has minimal impact on the rate of the flow. After passing through the solids-processing unit, the slurry of particulate flow is pumped to the separator unit.

At step 350, the particulate flow including the crushed and fractured material is partitioned into a separator effluent or overflow and concentrate of crushed fouling material or underflow. The separator unit (270, 275) may be hydrocyclone or a similarly robust phase separator device. To maximize the process, the slurry enters a processing device at an optimized flow rate, for example at approximately 50-65 psi. Step 360 is the discharging of the concentrate to a land treatment unit 300 for further treatment of the concentrate, and step 370 is the discharging of the effluent to the cleaning deck 220 or directly into the surrounding water. Steps 360 and 370 preferably take place simultaneously. Although the flow rates may vary as necessary, the separator effluent may be discharged at a rate of about 100 to 110 gallons per minute or higher, and the concentrate may be discharged to the land treatment unit 300 at about 50 to 60 gallons per minute. As outlined above, the concentrate is discharged to the land unit 300 via an appropriately sized flexible conduit or hose 212 of about, for example, about 600 feet in length and about 2.0 inches in diameter. An appropriately sized flexible hose having for example, diameter of about 3 inches may also be used to discharge the separator effluent to the shroud or to the water. As outlined above, diameters of the hoses assist in maximizing the different flow rates.

The described systems and techniques for waterborne underwater hull cleaning provide a means to mitigate the discharge of removed toxicants from underwater hull cleaning operations. This is accomplished by providing the integrated on-board processing of removed material while reusing working fluid to produce a single manageable wastestream concentrate that can be transported at relatively small flows, through, for example, flexible hose, over distances, for example, in excess of 600 feet, to a topside or other remote location where further wastestream management can be accomplished. The described systems and techniques improve upon long-standing technology that does not process or manage material removed during waterborne hull cleaning.

What has been described and illustrated herein are preferred embodiments of the invention along with some variations. The terms, descriptions and figures used herein are set forth by way of illustration only and are not meant as limitations. For example, the diameters of lines 209, 210, 211, and 212 shown in FIG. 2A, may vary depending on operating conditions and requirements. For instance, line 212 may be made to be smaller or larger to accommodate for the varying sizes of the crushed solid particles in the concentrate. Additionally, FIG. 2D shows three movable brushes for cleaning hull surfaces, but more or less than three brushes may be incorporated in the invention or other cleaning technologies such as waterjets, cavitating jets, ultrasonic transducers, or low pressure whips. Those skilled in the art will recognize that many variations are possible within the spirit and scope of the invention, which is intended to be defined by the following claims and their equivalents, in which all terms are meant in their broadest reasonable sense unless otherwise indicated.

What is claimed:

1. A cleaning vehicle for cleaning an underwater surface, the cleaning vehicle comprising a pre-processing deck and a cleaning deck pivotally connected to the pre-processing deck, wherein the pre-processing deck comprises:

one or more circulation pumps downstream of the cleaning deck for initiating cleaning deck suction onto the underwater surface and for initiating a particulate flow of water entrained material removed by the cleaning deck;

a solids-processing unit downstream of the cleaning deck for crushing and fracturing solids in the particulate flow;

a separator unit downstream of the solids-processing unit for partitioning the particulate flow into a separator effluent and a concentrate of crushed material; and, the cleaning deck comprises one or more abrasion devices for removing fouling from the underwater surface, and a deck mouth for the intake of the particulate flow of water entrained material.

2. The cleaning vehicle of claim 1, further comprising a concentrate evacuation port attached to the separator unit for evacuating the concentrate of crushed material to a land treatment unit;

an effluent evacuation port attached to the separator unit for evacuating the separator effluent from the separator unit.

3. The cleaning vehicle of claim 2, wherein the one or more abrasion devices comprise one or more movably mounted brushing units, the cleaning deck further comprising;

at least one motor connected to the one or more movably mounted brushing units for powering the one or more movably mounted brushing units; and a deck seal for maintaining a reduced pressure relationship between the cleaning deck and the underwater surface.

4. The cleaning vehicle of claim 3, wherein the one or more abrasion devices further comprises one or more nozzle exits.

5. The cleaning vehicle of claim 4, wherein the cleaning deck further comprises:

a recycle port for receiving separator effluent evacuated from the separator unit and directing the separator effluent to the one or more nozzle exits, wherein the cleaning vehicle further comprises a flexible recycle hose for channeling the separator effluent to the cleaning deck, the recycle hose having a first end attached to the effluent evacuation port and a second end attached to the recycle port of the cleaning deck, and wherein the one or more circulation pumps is configured to pump the separator effluent to the cleaning deck at a rate of about 100 gallons per minute to about 110 gallons per minute.

6. The cleaning vehicle of claim 5, wherein the one or more brushing units comprise circularly arranged brushes mounted for rotatable motion, the brushes made from stainless steel, polypropylene, or combinations thereof.

7. The cleaning vehicle of claim 6, wherein the separator unit is a hydrocyclone separator.

8. The cleaning vehicle of claim 1, further comprising:

a deck intake hose connected to the deck mouth, and attached between the cleaning deck and the pre-processing deck for directing the particulate flow of water entrained material from the cleaning deck to the pre-processing deck;

a recycle hose attached to the pre-processing deck and to the cleaning deck for directing separator effluent from the pre-processing deck to the cleaning deck; and a land transport hose attached at one end to the pre-processing deck and at the other end to a land treatment unit for transporting the concentrate of crushed material to the land treatment unit, wherein the recycle hose has a first diameter and the land transport hose has a second diameter, wherein the ratio of the first diameter to the second diameter is about 3 to 2.

9. The cleaning vehicle of claim 8 wherein the first diameter is about 3 inches and the second diameter is about 2.0 inches.

10. The cleaning vehicle of claim 1, further comprising:

a deck intake hose connected to the deck mouth, and attached between the cleaning deck and the pre-processing deck for directing the particulate flow of water entrained material from the cleaning deck to the pre-processing deck;

a recycle hose attached to the pre-processing deck and to the cleaning deck for directing separator effluent from the pre-processing deck to the cleaning deck; and a land transport hose attached at one end to the pre-processing deck and at the other end to a land treatment unit for transporting the concentrate of crushed material to the land treatment unit.

11. The cleaning vehicle of claim 10, wherein the one or more abrasion devices comprise one or more movably mounted brushing units, the cleaning deck further comprising;

at least one motor connected to the one or more movably mounted brushing units for powering the one or more movably mounted brushing units; and a deck seal for maintaining a reduced pressure relationship between the cleaning deck and the underwater surface.

12. The cleaning vehicle of claim 11, wherein the cleaning deck further comprises:

a recycle port for receiving separator effluent evacuated from the separator unit and directing the separator effluent to the one or more nozzle exits, wherein the cleaning vehicle further comprises a flexible recycle hose for channeling the separator effluent to the cleaning deck, the recycle hose having a first end attached to the effluent evacuation port and a second end attached to the recycle port of the cleaning deck.

13. A method of cleaning an underwater hull surface using a cleaning vehicle having a pre-processing deck and a cleaning deck pivotally connected to the processing deck, wherein the pre-processing deck comprises one or more circulation pumps, a solids-processing unit, and a separator unit, wherein the solids-processing unit is positioned downstream of the cleaning deck and the separator unit is positioned downstream of the solids-processing unit, and wherein the cleaning deck comprises one or more abrasion devices and a cleaning deck mouth, the method comprising:

positioning the cleaning deck into contact with the underwater surface by using the one or more pumps to generate a reduced pressure between the cleaning deck and the underwater hull surface;

removing fouling from the underwater hull surface by applying the one or more abrasion devices to the underwater hull surface;

generating a particulate flow of water entrained material removed by the one or more abrasion devices, by using the one or more pumps positioned downstream of the cleaning deck to draw the removed material and surrounding water within the deck mouth;

crushing and fracturing in the solids-processing unit, solid material in the particulate flow; and partitioning in the separator unit the particulate flow into a separator effluent and a concentrate of crushed fouling material.

14. The method of cleaning of claim 13, wherein the one or more cleaning units comprise circularly arranged brushes, the method of cleaning comprising rotating the circularly arranged brushes against underwater hull surface.

15. The method of cleaning of claim 14, further comprising:

discharging the separator effluent to surrounding water;

discharging the concentrating of crushed material to a land treatment unit.

16. The method of cleaning of claim 13, wherein the one or more cleaning units further comprise one or more nozzle exits, the method further comprising:

recycling the separator effluent to the cleaning deck;

discharging a stream of separator effluent through the nozzle in a direction so that the stream flushes the brushes and creates a stream current that directs material into the cleaning deck mouth; and discharging the concentrate of crushed material to the land treatment unit.

17. The method of cleaning of claim 16, wherein separator effluent is recycled back to the cleaning deck at a rate of about 100 gallons per minute to about 110 gallons per minute.

18. The method of cleaning of claim 17, wherein concentrate of crushed material is discharged to the land treatment unit at a rate of about 50 gallons per minute to about 60 gallons per minute.

* * * * *